United States Patent [19]

Hultberg

[11] 4,368,962
[45] Jan. 18, 1983

[54] SOLAR TRACKING APPARATUS AND SYSTEM

[76] Inventor: Donald E. Hultberg, 629 Quail Dr., Los Angeles, Calif. 90065

[21] Appl. No.: 229,667

[22] Filed: Jan. 30, 1981

Related U.S. Application Data

[63] Continuation-in-part of Ser. No. 130,194, Mar. 13, 1980, abandoned, which is a continuation of Ser. No. 923,881, Jul. 12, 1978, abandoned.

[51] Int. Cl.³ .................................... G03B 21/00
[52] U.S. Cl. .................................... 353/3; 126/425; 350/289
[58] Field of Search .............. 353/3; 350/83, 289; 126/424, 425

[56] References Cited

U.S. PATENT DOCUMENTS

| Re. 25,242 | 9/1962 | Toulmin | 353/3 |
|---|---|---|---|
| 125,030 | 3/1872 | Dille et al. | 353/3 |
| 2,599,381 | 6/1952 | Gerks | 353/3 |
| 4,139,286 | 2/1979 | Hein et al. | 353/3 |
| 4,202,321 | 5/1980 | Volna | 126/425 |
| 4,266,179 | 5/1981 | Hamm | 353/3 |
| 4,295,621 | 10/1981 | Siryj | 126/425 |

FOREIGN PATENT DOCUMENTS 326516  9/1920  Fed. Rep. of Germany .......... 353/3

*Primary Examiner*—Steven L. Stephan
*Attorney, Agent, or Firm*—David O'Reilly

[57] ABSTRACT

A solar tracking apparatus and system for supporting and use with solar devices. The apparatus is comprised of a pair of concentric shafts oriented parallel to the earth's rotational axis with one shaft being rotated by a motor at one revolution per day, so that a yoke rigidly attached to this shaft will follow the diurnal motion of the sun. The second concentric shaft is rotated at a rate relative to the first shaft and by means of a spherical four-bar linkage will automatically produce a rotational oscillation of a support or gimbal mounted on the yoke equal to the yearly declination of the sun. A means is also provided for advancing or retarding the diurnal motion of the yoke at specific times of the year so as to correct for anomalies in the motion of the sun, commonly known as "the equation of time". A means is also provided for coupling a large array of solar tracking yokes to a single central drive unit.

29 Claims, 6 Drawing Figures

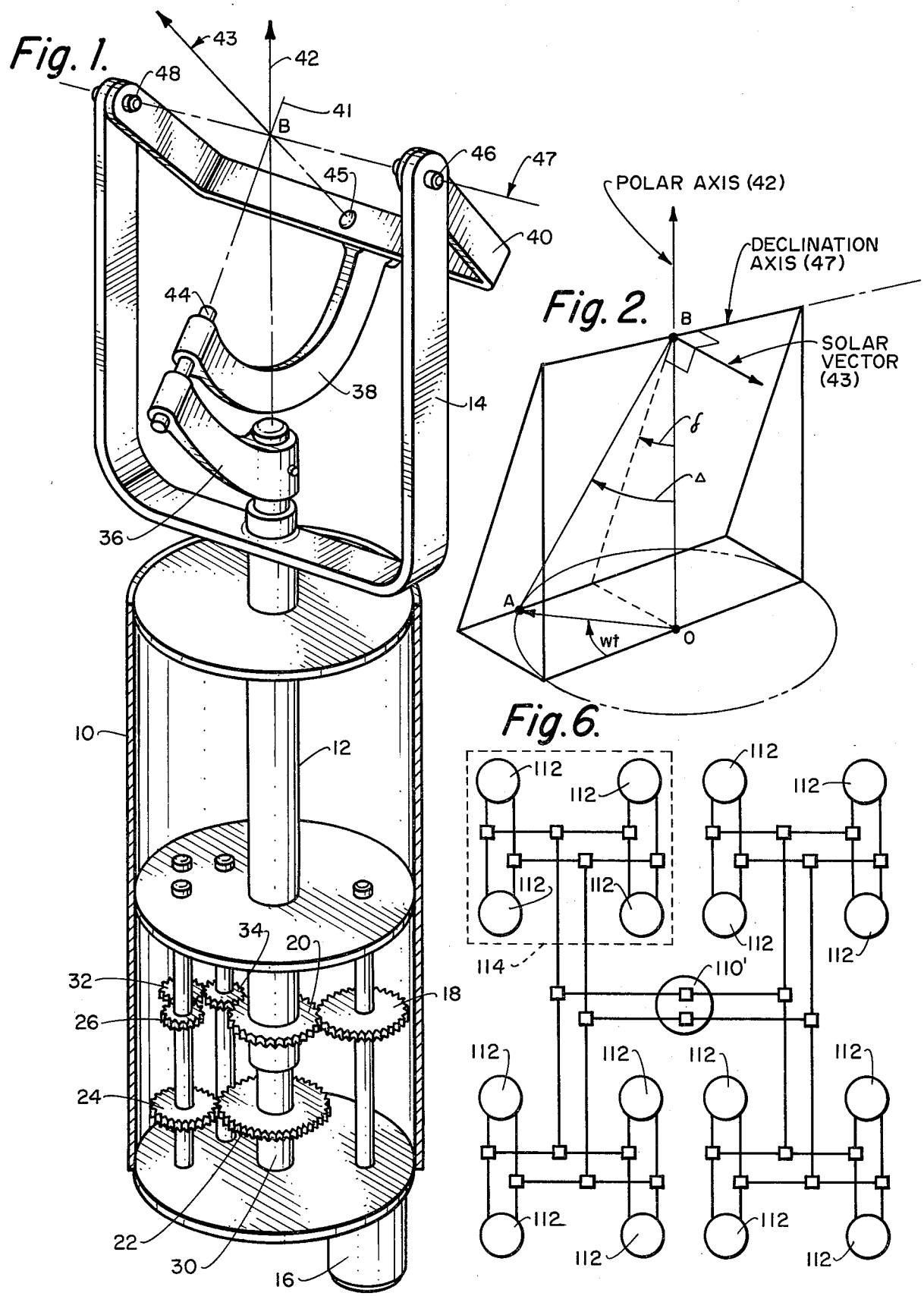

SOLAR TRACKING APPARATUS AND SYSTEM

This application is a continuation-in-part of application Ser. No. 130,194 filed Mar. 13, 1980, now abandoned which is a continuation of application Ser. No. 923,881, filed July 12, 1978, now abandoned.

BACKGROUND OF THE INVENTION

This invention relates to sun tracking devices and more particularly relates to a sun tracking apparatus of system for mounting solar devices.

A solar tracking device is sometimes referred to as a sun follower and is a slowly rotating mechanism in which a specific surface or axis of the apparatus is maintained to always point toward the sun. These solar trackers or sun followers are used for a number of purposes, such as a heliostat, a solar heater or furnace, or with a solar panel for collecting the sun's energy. A heliostat is a mechanism containing a rotating flat mirror capable of directing the sun's rays at some fixed point. A solar heater or furnace is an apparatus in which a lens or parabolic reflector is rotated, usually around its focal point so as to maintain its optical axis pointing toward the sun. Solar panels can be any type of device for collecting the sun's energy, such as solar cells, sensors, or other instruments whose surface is maintained perpendicular to the sun's rays.

Heliostats are particularly useful for applications in the areas of residential and industrial illumination, spectacular light show displays, for intense or concentrated lighting or illumination for solar power generation, and as a scientific tool in the general field of solar experimentation. For solar power generation, "solar farms" may be constructed containing large arrays of heliostats.

There are two common types of mounting configurations for these solar tracking devices. These are the horizon mount and the equatorial mount. One type of device which most frequently uses the horizon mount is a sun tracker having a servo-driven rotatable platform. This is usually an arrangement having two axes of rotation. A main yoke rotates in azimuth with its axis perpendicular to a horizontal plane, while the inner gimbal has its axis in the horizontal plane and rotates vertically in elevation. Each axis will be driven by an independent servo or torque motor and each motor receives its drive command from an independent axis oriented solar sensor which may be a photocell sensitive to light or a thermal-type sensor. This two-axis rotational system is operated by producing a null whenever the yoke and gimbal are pointed directly at the sun's rays. There are, however, several disadvantages to this system. One of these is that a high-speed, high-torque motor is required for each axis. Another disadvantage is that a complicated closed-loop, sensing control drive system (with damping) is required for each motor. A further disadvantage is that high acceleration rates can be encountered whenever the platform slews to follow a randomly shadowed sun.

The so-called equatorial mount device is also a two-axis yoke and gimbal. However, in this device the axis of the main yoke is oriented parallel to the earth's rotational axis. In this device a rotation around the polar axis counter to the earth's rotation will cause the main yoke to follow the sun's diurnal motion, a rotation which is essentially linear in time. For this reason a clock motor is most often used to drive this axis. The inner gimbal can be kept pointing directly at the sun by making it rock back and forth sinusoidally once per year to a maximum angular offset of plus or minus $23\frac{1}{2}°$, which is equal to the obliquity of the ecliptic. This means the inner gimbal rotates on the declination axis only a small amount each day; therefore, this adjustment is frequently done manually every day or so. While manual adjustment every day or so is relatively economical, it certainly is not very convenient. Mechanization of the declination adjustment can be made by installing a second, one-revolution-per-year motor on the main yoke with appropriate levers to tilt the inner gimbal back and forth the appropriate amount. However, as with the horizon-mounted servo system, this yields a two-motor device which is further complicated by the necessity for slip rings with the second motor. Another method of mechanizing the declination adjustment is by gearing down the main drive to one revolution per year and coupling the declination of the inner gimbal to it. This technique is described in U.S. Pat. No. 3,656,844, issued Apr. 18, 1972, to Botskor, for a sun-following device. The difficulty with the device disclosed in this patent is that it is extremely complicated and does not appear to accurately follow the sun.

SUMMARY OF THE INVENTION

The purpose of the present invention is to provide a solar tracking apparatus or mounting system for supporting solar devices which automatically and continuously track the sun.

The solar tracker or sun follower of the present invention has an automatic mechanism for controlling the declination. The solar tracking apparatus is constructed for mounting parallel to the earth's rotational axis (i.e., an equatorial mount), with all functions or movements of the apparatus being driven by a single clock motor (i.e. an open loop drive system). The motor is coupled through gears to a main shaft which rotates at a uniform rate of exactly one revolution per day. A main yoke is rigidly attached to the main shaft and hence rotates therewith following, approximately, the hour-angle motion of the sun. Automatic declination control is accomplished by a secondary shaft concentric to the main shaft rotated at a predetermined rate of 1.00273791 revolutions per day. This rate was determined by the ratio of siderial days per year to the solar days per year (i.e. 366.24/365.24). This yields a differential rotational rate between the main shaft and the concentric inner shaft of exactly one revolution per year. This increased rotational rate of the concentric shaft is achieved by means of a differential gear train coupled to and driven by the main shaft. It consists of a plurality of gears whose gear tooth ratio is selected to produce a rotation rate of the concentric shaft approximately equal to 1.002,737,91 revolutions per day.

The automatic declination control is achieved by a gimbal or support rotatably attached to the main yoke and linked to the second concentric shaft by a "space crank". The "space crank" linking the support or gimbal to the second concentric shaft automatically rotates the support to follow the declination of the sun. The "space crank" is comprised of a pair of angled or curved arms joined together by a rotatable pivot with one arm rigidly secured to the secondary shaft at one end and the other arm rotatably secured to the gimbal or support at the other end. Rotation of the second concentric shaft relative to the first concentric shaft causes the plane of the gimbal or support to slowly oscillate about an axis perpendicular to the axis of the shaft by an amount equal to the declination of the sun (i.e., a total of 46°).

While the mechanism described may be adequate for many applications, additional mechanical components have been provided for correcting two particular errors which can be produced by the actual motion and relative position of the earth to the sun. The first of these errors may be caused by the obliquity of the sun's ecliptic, while the second is caused by the eccentricity of the earth's orbit around the sun. In order to incorporate these error-correction devices, the main shaft is split into two separately rotatable shafts. The first portion of the main shaft is then rotated at the previously described one-revolution-per-day and linked to the clock motor through a suitable gearing system.

To correct for the obliquity of the ecliptic, the diurnal motion of the yoke is corrected by gear mechanism from the first section of the split main shaft through a gear train and a crank arm connected to a pushrod linked to an arm rigidly secured to the second section of the main shaft. The second section of the main shaft has the main yoke connected to it for rotation therewith. Correction for both errors is accomplished by a pair of gear trains linked to the upper main shaft through a pair of cranks which introduce a slight lead or lag (depending upon the time of the year) in the one-revolution-per-day rotation of the main yoke, thus providing compensation for errors in the rotation.

While the apparatus described above is that of a motorized drive mechanism rotating a single yoke and gimbal, it is equally feasible to couple two or more yokes (with gimbals) to a single central drive mechanism driven by a single motor. An especially unique method for coupling the central drive mechanism to a plurality of tracking yokes is described in which errors resulting from the torsional twisting of connecting drive shafts can be easily eliminated. It consists of an arrangement of drive shafts branching outward from the central drive mechanism, subdividing by a geometrical progression of right-angle gear boxes so as to terminate on $2^n$ tracking yokes, where n is the number of successive similar branches in the array.

It is one object of the present invention to provide a solar tracking apparatus which automatically tracks the sun's motion relative to the earth.

Still another object of the present invention is to provide a solar tracking apparatus incorporating a mounting system for solar devices.

Yet another object of the present invention is to provide a solar tracking apparatus which is relatively simple in construction and operation.

Still another object of the present invention is to provide a solar tracking apparatus having an open loop drive system eliminating the need for a closed loop servo system.

Still another object of the present invention is to provide a solar tracking apparatus which automatically follows the declination of the sun.

Yet another object of the present invention is to provide a solar tracking apparatus which automatically corrects for errors in time resulting from the elliptical eccentricity of the earth's orbit around the sun.

Still another object of the present invention is to provide a solar tracking apparatus which automatically corrects for errors in time resulting from the obliquity of the ecliptic.

Yet another object of the present invention is to provide a solar tracking apparatus having means for mounting and coupling a large array of solar tracking yokes to a single central drive unit.

Other objects, advantages and novel features of the invention will become apparent from the following detailed description of the invention when considered in conjunction with the accompanying drawings, wherein like reference numbers identify like parts throughout.

BRIEF DESCRIPTION OF THE DRAWINGS

FIG. 1 is a side elevation of the solar tracking apparatus of the invention in partial section, illustrating the automatic declination and rotational control.

FIG. 2 is a schematic diagram illustrating geometrical features underlying the automatic declination control.

FIG. 6 is a plan view of an expanded array of trackers coupled together by a geometrical progression of right-angle gear boxes and shafts from a central drive unit.

DETAILED DESCRIPTION OF THE PREFERRED EMBODIMENT

Figure 3:
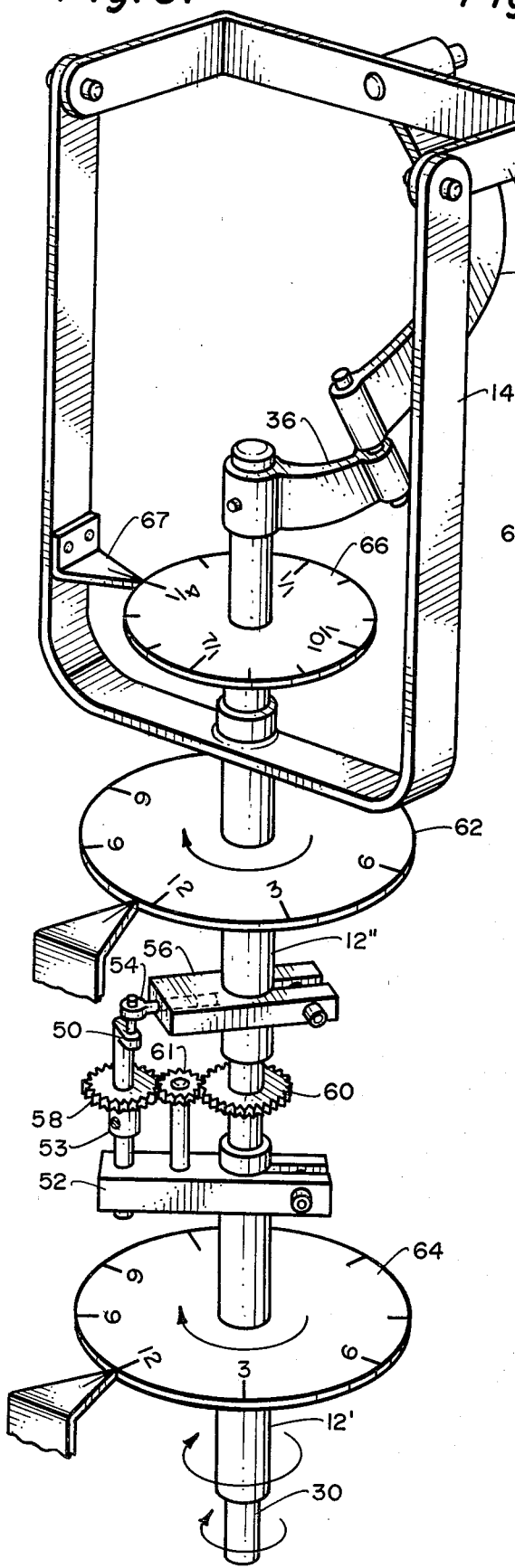
FIG. 3 is a view of the solar tracking apparatus illustrating the correction mechanism for eccentricity error.

The basic solar tracking or sun follower apparatus is illustrated in FIG. 1 and is designed to be mounted so that the main shaft is parallel to the earth's rotational axis (i.e. an equatorial mount). The solar tracking apparatus is comprised of a housing 10 supporting a main shaft 12, having a main yoke 14 rigidly secured to one end. The main shaft 12 and yoke 14 are driven by a constant-speed motor 16 providing a one-revolution-per-day operation through gears 18 and 20. The gears 18 and 20 are proportioned to provide one-revolution-per-day rotation of the main shaft 12 from the constant-speed motor 16. With proper mounting and alignment, the main yoke 14 rotating with the main shaft 12 now will follow the hour-angle motion of the sun.

Automatic declination control is achieved through a secondary shaft 30 coupled to the gear 20 on the main shaft 12 by gears 22, 24 and 26 having a preselected ratio. The gear 26 is coupled to the gear 20 through idler gears 30 and 32. The gear tooth ratios of gears 20, 22, 24 and 26 are selected to produce a rotation of secondary shaft 30 relative to main shaft 12 of approximately 1.00273791 revolutions per day for every one revolution per day of the main shaft 12. This number is the ratio of siderial days per year to solar days per year (i.e., (366 ¼)/(365 ¼)). Thus, the relative rotation of secondary shaft 30 to main shaft 12 and yoke 14 is a differential of exactly one revolution per year. Thus, the gear ratios of gears 20, 22, 24 and 26 are preselected such that the ratio is selected in accordance with the following equation:

$$\frac{(N_{20})(N_{24})}{(N_{26})(N_{22})} = \frac{366.242}{365.242} = 1.00273791 \tag{I}$$

where N=the number of teeth on each of these respective gears.

There are many gear trains as well as gear tooth ratios which are capable of satisfying this relationship. The two idler gears 32 and 34 required may be of any size. The idlers can also be eliminated by varying the diametral pitch of the gears so that the center-to-center distance of gears 20 and 26 equals the center-to-center distance of gears 22 and 24. Obviously, suitable sprockets and chains or timing belts could be substituted for the gear trains described, which would perform the same functions.

Attached to the secondary shaft 30 for producing the automatic declination control is a linkage comprised of arms 36 and 38 constructed to sinusoidally oscillate the support or inner gimbal 40, $\pm 23\frac{1}{2}°$ once per year relative to a plane perpendicular to the axis 42 of the secondary shaft 30. The linkage or arms 36 and 38 rotate about one another on a pivot pin 44. Linkage arm 38 is also rotatably connected to inner gimbal 40 by means of pin 45. The inner gimbal or support 40 is further rotatably connected by pins 46 and 48 on the ends of the arms of the main yoke 14. The polar axis 42 intersects at right angles the declination axis 47 which passes through pins 46 and 48. Furthermore, the rotational axis 41 of pivot 44 must intersect at right angles the rotational axis 43 of pivot 45 and this intersection point (B) must be identical with the first intersection point. This type of linkage or crank is known as a "space crank" and is a particular variation of a spherical fourbar linkage.

When the crank comprised of arms 36 and 38 is continuously rotated with respect to the yoke, the inner gimbal rocks or oscillates back and forth about an axis perpendicular to the axis of the secondary shaft 30 in conformance with the following equation derived from the pictorial diagram of FIG. 2.

$$\text{TAN } \delta = \text{TAN } \Delta \text{SIN } \omega t. \tag{II}$$

where:
- $\delta$ = the instantaneous angle of oscillation (in our case the daily declination angle).
- $\Delta$ = the maximum declination angle. This would normally be equal to the obliquity of the ecliptic (23.4523°).
- $\omega$ = the rotation velocity of the space crank with respect to the yoke 14 $(2\pi)/(365.242)$ radians per day).
- $t$ = time in days ($t=0$ on March 21, the vernal equinox).

The solar tracking device illustrated in FIG. 1 and described above generates a reasonably close approximation to the true solar declination function. However, true solar declination obeys the following equations:

$$\text{SIN } \delta = \text{SIN } \Delta \text{ SIN } (\theta - \theta) \tag{III}$$

$$\text{TAN } \delta = \text{TAN } \Delta \text{ SIN } \alpha \tag{IV}$$

$$\text{TAN } \alpha = \text{COS } \Delta \text{ TAN } (\theta - \theta_o) \tag{V}$$

where: $\alpha$ = the right ascension of the sun and is a non-linear function of time.
- $\theta$ = the angle to the radius vector of the earth's orbit measured from perihelion, also a non-linear function of time.
- $\theta_o$ = the value of $\theta$ on the first day of spring.

A numerical comparison of equations II and III shows that if $\theta - \theta_o = \omega t$, the two expressions would only agree with each other at four distinct times during the year, namely at the equinoxes ($\omega t = 0, \pi$) and at the solstices ($\omega t = \pi/2, 3\pi/2$). At all other times the declination is in error by as much as $\pm \frac{3}{4}°$. This error disappears when the yoke is rotated at the non-linear rate, $\alpha(t)$, instead of the linear rate, $\omega t$, describes above.

For many applications an error in declination of $\pm \frac{3}{4}°$ might easily be tolerated, in view of the simplicity of the solar tracking apparatus described up to this point. However, there is an error which is much less tolerable which affects the diurnal motion of the yoke 14. It can be shown that the true sun (called the apparent sun) leads the mean sun (generated by a clock or clock motor) by as much as plus (+) sixteen minutes in time (+4°) or lags the mean sun by as much as minus (−) fourteen minutes in time ($-3\frac{1}{2}°$) at various times of the year. The difference between the apparent time and the mean time of the sun is called "the equation of time" and is frequently referred to in ordinary alamanacs as "Fast Sun" or "Slow Sun". The word "equation" is used in its old sense as a "correction".

This equation (i.e. "correction") of time can be resolved into two major components. Both are due to variations in the sun's angular velocity as viewed from the earth. One of these components is due to the variation in speed of the earth as it moves in its elliptical orbit around the sun. This orbital eccentricity causes the earth to move faster in the winter (at perihelion) and slower in the summer (at aphelion). The second component in the equation of time is due to the difference in hour angle between a fictitious sun (known as the mean sun) which is imagined to move uniformly along the celestial equator as determined by a clock, and the real sun (or apparent sun) which moves along the ecliptic and generates time as expressed by a sun dial. This latter error will hereinafter be called the obliquity error. These two errors are explained more fully in the book "Practical Astronomy" by G. L. Hosmer, 3rd Ed., John Wiley, N.Y., 1931, pages 42 through 45.

The two error components are very nearly sinusoidal in time. The eccentricity error has one cycle per year starting at July 1 (aphelion) and has an amplitude of plus or minus eight minutes in time ($\pm 20°$). The obliquity error has two complete cycles per year starting at March 21 (the vernal equinox) and at September 23 (the autumnal equinox). Its amplitude is plus or minus ten minutes in time ($\pm 2\frac{1}{2}°$). Thus, the two errors are additive and when combined yield a complex curve, illustrated in FIG. 32, page 44 of "Practical Astronomy" by Hosmer.

Figure 4:
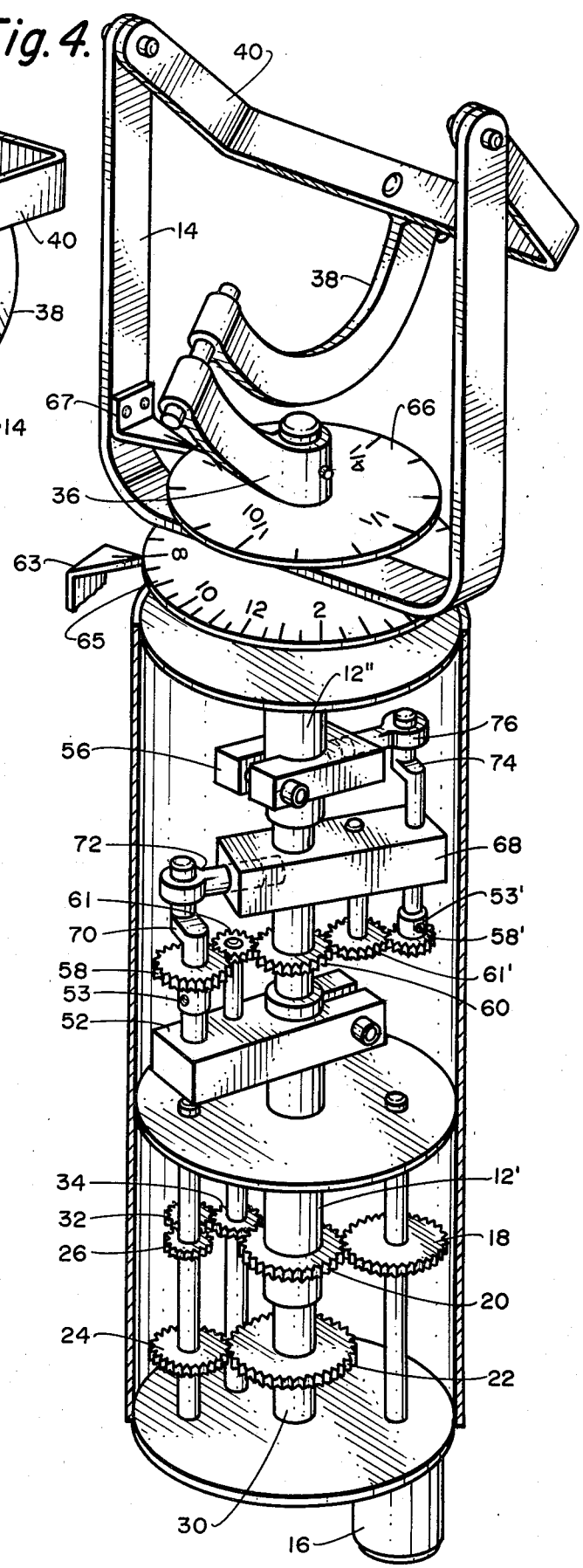
FIG. 4 is a side elevation of the solar tracking apparatus of the invention in partial section illustrating the incorporation of two error correction mechanisms for eccentricity error and obliquity error.

Compensating mechanisms to eliminate these two errors are illustrated in FIGS. 3 and 4.

The error correction mechanism illustrated in FIG. 3 will remove either of the errors due to eccentricity or obliquity of the earth's orbital motion around the sun with minor modifications. To incorporate the error mechanism the main shaft is divided into two sections 12' and 12", with the first section 12' being driven uniformly at one revolution per day by the motor 16 as in the original embodiment. An arm 52 is clamped or secured to the uniformly rotating lower main shaft 12' and rotatably supports a small crank arm 50. The eccentric action of the crank 50 drives a pushrod 54 in and out of a second arm 56, clamped or secured to the upper extension of the main shaft 12". The small crank 50 is driven by a one-to-one gear train comprised of gears 58, 60 and idler gear 61. The drive gear 60 is mounted on or secured to the concentric inner or secondary shaft 30. The eccentric action of the crank 50 causes the upper main shaft 12" to lead or lag the uniformly rotating lower main shaft.

The maximum angular difference in load or lag is determined by the length of the crank arm 50 to the length of gear separation and is made equal to ±20°. Since the inner or secondary shaft 30 rotates once per year with respect to the lower main or outer shaft 12', and since the gear ratio of gears 58 and 60 is one-to-one, the eccentric crank will make one complete rotation per year. The orientation of the crank arm 50 must bear a fixed and definite relationship with respect to the space crank 36. Since the space crank 36 rotates once per year with respect to the yoke 14, it is apparent that it must be in the plane of the yoke on both the vernal and autumnal equinoxes and perpendicular to the yoke at the solstices. By attaching a date dial 66 to the space crank, and an index 67 to the yoke, the dial can be calibrated so that this relationship exists. The crank arm 50 must now be oriented so that its maximum in-line extension occurs when the date dial reads July 1. One method for initially setting the crank arm 50 is by providing an adjustable attachment such as a hub on gear 58 with a set screw 53 which permits orientating the crank arm 50 with respect to its gear 58 and hence with respect to shaft 30, data dial 66, and space crank 36. Set screw 53 would then be permanently tightened. The idler gear 61 is needed because it can be shown that the time derivative of the angular correction angle must be greatest in the winter at perihelion, when the sun is moving fastest.

The two hour dials, 62 and 64, respectively attached to shafts 12" and 12', as shown in FIG. 3, are simply to illustrate the fact that shaft 12" is lagging shaft 12' when the date dial 66 points to April 1. Only one hour dial, 65, (similar to dial 62 in FIG. 3) is actually required in a practical mechanism as shown in FIG. 4 to permit setting the yoke to the correct local apparent time. Its index 63 would normally be attached to a fixed support such as a mounting pedestal, 80a through 80d, shown in FIG. 5.

The mechanism for compensating for the error due to obliquity of the ecliptic is almost identical to that shown in FIG. 3. It is essentially the same mechanism as the eccentricity mechanism except that the gear ratio of gear 60 to gear 58 is now two-to-one and the length of the crank arm 50 is slightly increased to yield a correction of approximately ±2½°. Actually the ratio of crank arm length to inter gear separation is:

$$\frac{1 - \cos\Delta}{1 + \cos\Delta} \tag{VI}$$

where: $\Delta$ is equal to the obliquity of the ecliptic (23.4523°). The two-to-one gear ratio results in two complete lead-lag cycles per year of upper main shaft 12" relative to lower main shaft 12'. The orientation of the crank arm 60 is initially set for maximum in-line extension of pushrod 54 on March 21 (the vernal equinox) by tightening set screw 53. Again, the idler gear 61 is needed to make the mechanism agree with solar motion.

Both correction mechanisms can be incorporated into a single device as illustrated in FIG. 4. In this embodiment, arms 52 and 56 are attached to the lower and upper main shafts 12' and 12", respectively, as before. However, a third arm 68, rotatably journaled on the inner shaft, is employed to simultaneously transfer the output of the first error corrector onto the input of the second error corrector and hence onto shaft 12' and yoke 14. The crank 70 now operates a pushrod 72 in arm 63 which in turn supports crank arm 74, driving pushrod 76 into arm 56, secured to upper main shaft 12". The gear ratios are the same as before for each correction. That is, gear 60 attached to the inner or secondary shaft 30 has a one-to-one ratio with gear 58. On the other side there is a two-to-one ratio of gear 60 to gear 58' operating the crank arm 74. Idler gears are incorporated as before. It is essential that the eccentricity error correction device precede and hence drive the obliquity correction device and not vice versa.

The yoke 14 will now rotate at local apparent solar time, and hence will follow the sun exactly in its hour-angle motion. Furthermore, the slowly varying angle between the space crank comprised of arms 36 and 38 and the yoke 13 is no longer $\omega t$ which varied uniformly with time, but is now the non-linear function $\alpha(t)$, i.e. the true right ascension of the sun. Hence, equation II for the space crank now becomes:

$$\text{TAN } \delta = \text{TAN } \Delta \text{ SIN } \alpha \tag{II(a)}$$

As can readily be seen, this is exactly the same equation as equation IV, the solar equation given above. Hence, the small error ±0.78° previously mentioned as inherent in the space crank 36, 38 has disappeared completely. The inner gimbal 40 will now also follow the sun exactly in its declination motion.

For most sun-tracking or sun-following applications, the angle $\Delta$ is made equal to 23¼°, the obliquity of the ecliptic. however, when using the sun tracker as a heliostat, in which a flat mirror is supported in the gimbal or support 40 to reflect the sunlight in a direction parallel to the earth's orbital axis, the space crank's angle $\Delta$ is halved to 11¾° and the mirror (not shown) cocked at 45° with respect to the gimbal, so that the angle of incident sunlight will equal the angle of reflected sunlight throughout the year.

It should be readily apparent that the sun tracker or follower can be mounted (parallel to the polar axis) so that the yoke 14 points toward the north celestial pole or towards the south celestial pole. In the latter case, the motor and dials must be reversed and the correction mechanism reset. This would be true whether one is located in the northern or southern hemisphere.

Thus, the invention disclosed in FIGS. 1 through 4 involves four mechanisms for producing a yearly declination function as an adjunct to a one-revolution-per-day sun follower. These are:

1. The differential gear train driven by the one-revolution-per-day main shaft and driving a concentric secondary or inner shaft at a rate of 1.00273791 revolutions per day so as to yield a differential rotation of one revolution per year.

2. A space crank attached to the above concentric inner or secondary shaft which is comprised of a suitable linkage which rocks an inner gimbal or support back and forth once per year so as to closely follow the declination of the sun.

3. A mechanism which completely corrects the diurnal motion of the yoke for errors caused by obliquity of the ecliptic.

4. A mechanism which corrects the diurnal motion of the yoke for errors caused by the eccentricity of the earth's orbit around the sun.

These mechanisms produce a device which is completely automatic in operation, which is simple in design and hence economical to manufacture, which uses a single motor for providing all functions and which is capable of tracking the sun with extreme precision.

Figure 5:
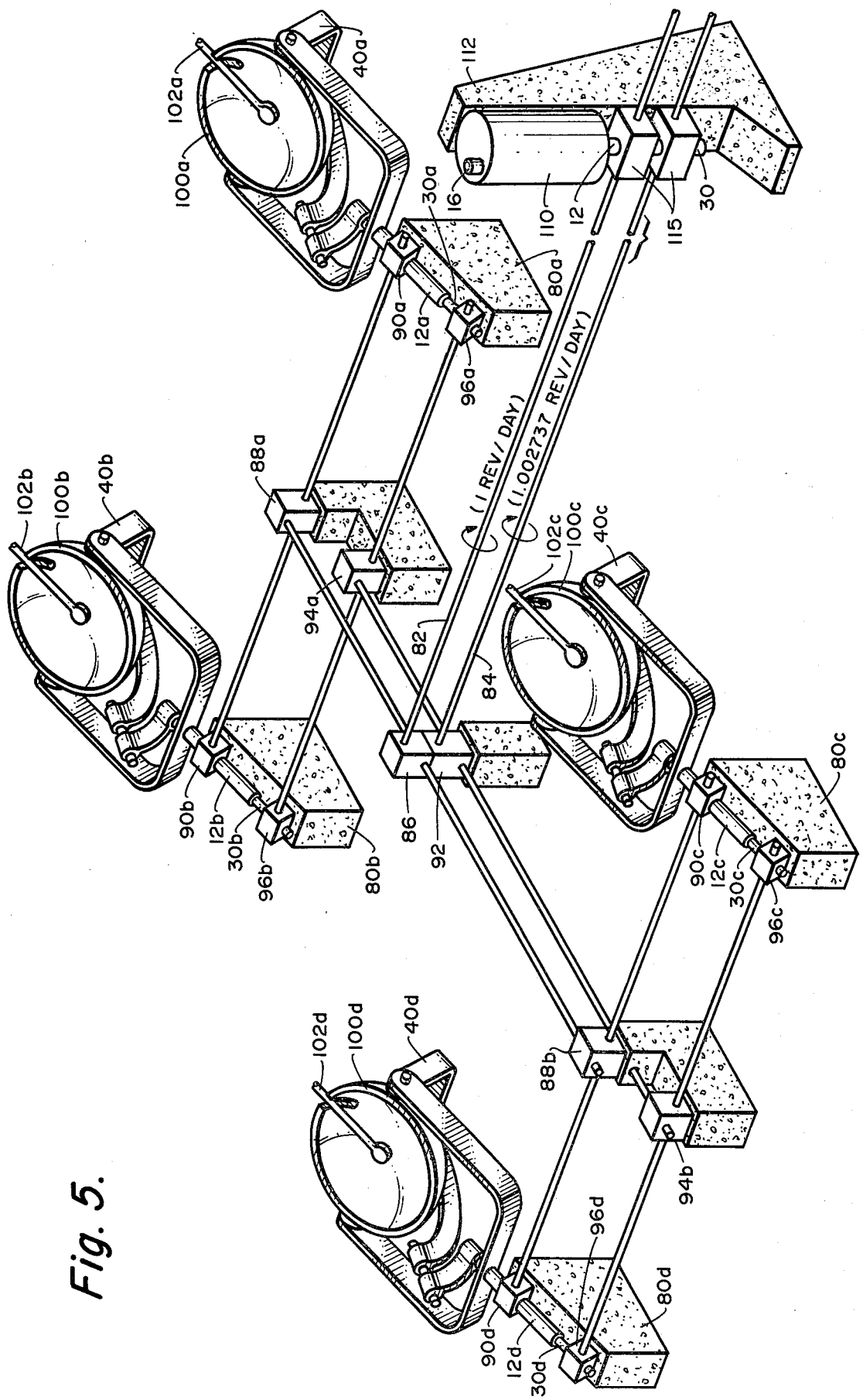
FIG. 5 illustrates the use of the invention for supporting and coupling drive shafts to solar devices in a large array.

The solar tracking system and mounting is ideal for use in multiple arrays as illustrated in FIG. 5 and semi-schematically in FIG. 6. In FIG. 5 an array of four solar trackers supporting solar devices is illustrated. Each solar tracker will be mounted on a pedestal 80a through 80d with the main yoke's axis parallel to the earth's rotational axis in the so-called "equatorial mount". A single drive mechanism 110, having the gear arrangements of either FIGS. 1, 3 or 4, will be remotely located on a pedestal 112 for simultaneously driving all of the individual solar trackers of the array through gear boxes 115 and connecting rods or drive shafts 82 and 84 coupled through right-angle gear boxes to each solar tracker.

Connecting rod 82 will provide a one-revolution-per-day drive to the main shaft 12a through 12e through one-to-one gear boxes 86, 88a and 88b and through one-to-one gear boxes 90a through 90d. The inner concentric or secondary shaft 30a through 30d will be driven at the slightly greater rate of revolution by connecting rod 84 through gear boxes 92, 94a, 94b and 96a through 96d.

Attached to the gimbal support 40a through 40d will be an appropriate solar device 100a through 100d. In this case a parabolic mirror is illustrated, but the tracking system can support a variety of solar devices such as heat collectors or light-reflecting devices. Tubular elements 102a through 102d are orientated along the polar axis with their terminus positioned in the focus of their respective parabolic mirrors (100a through 100d) so as to receive the concentrated solar energy. Their means of support (not shown) would be independent of the rotating mechanism. Also, the collected solar energy from each tube would run into a manifold (not shown) for ultimate exploitation.

FIG. 6 illustrates in plan view the method for geometrically branching out an array of drive shafts from a central drive unit 110', so as to terminate in $2^n$ trackers 112, where n is the number of successive similar branches occurring in the array. The first branch (n=1) occurs at the central drive unit where the first pair of right-angle gear boxes is installed (item 115 in FIG. 5). The right-angle drive shafts extending outward in both directions from this pair of gear boxes can either terminate in a pair of trackers (in which case $2^n = 2^1 = 2$), or a second branching can be made (n=2) by installing a pair of right-angle gear boxes at each end. Again, by extending the drive shafts outward in both directions from the gear boxes, one can either install four trackers at the four terminal points (in which case $2^n = 2^2 = 4$) or one can install more right-angle gear boxes (n=3, etc.). There are four branch levels shown in FIG. 6 and hence there are $2^4 = 16$ trackers 112 at the terminal points. The dotted line 114 encircles an array of four trackers corresponding to the array illustrated in FIG. 5. It is apparent that when n=0, (i.e., $2^n = 2^0 = 1$), there are no branches in the drive shafts and the "array" simply reverts to the original case of a single tracker driven by its drive means.

An advantage of coupling the array as shown is that if there is a torsional twisting of connecting rods or drive shafts, it will be the same at each symmetrical point in the array. Therefore, each sun tracker will lag the input by a fixed and constant amount, and hence all lag angles can be removed by one adjustment. The same cannot be said for other coupling schemes, such as connecting each yoke in series down each row and then connecting each row in series to a central drive unit.

As indicated above, the gear boxes for transferring the output from the drive system through the connecting rods or shafts 82, 84 to each solar tracker are one-to-one gear ratios. However, alternatively each right-angle gear box connecting the input drive shafts 82, 84 to each solar tracker might be some other ratio rather than one-to-one. For example, if the input drive unit was a motor operating at 1 rpm, one would have to gear down by a factor of 1440 to 1, to get one revolution per day. Similarly, the 1.00273791 rpm shaft must be reduced by 1440 to 1 to get 1.00273791 revolutions per day. Gearing down a ratio of this amount would be preferably done by distributing the gearing throughout the right-angle gear boxes connecting the input drive shafts or connecting rods 82, 84 to each solar tracker. Since in the embodiment of FIG. 5 there are three right-angled gear boxes from each drive shaft 82, 84 to the respective shafts 12 and 30 of each sun tracker, gear boxes of 16 to 1, 10 to 1 and 9 to 1 would provide an appropriate reduction ratio.

An especially unique case exists when all gear boxes are 2 to 1 ratio. In this case an array of $2^n$ trackers would require a central drive mechanism which rotates at $2^n$ revolutions per day (and, of course, $1.00273791 \times 2^n$ revolutions per day). The unique feature of this array is that the torque is a constant from input to output (neglecting friction). Thus, if one foot-pound of torque is required to rotate a single tracker at one revolution per day, a torque of one foot-pound is also required to rotate $2^n$ trackers at $2^n$ revolutions per day.

In the previous examples the central drive unit operates at speeds faster than one revolution per day. If it is desired to correct the yoke's rotational velocity for the equation-of-time anomaly, the mechanism as previously described in FIGS. 3 and 4 cannot be used for the central drive mechanism. This is because the differential rotation at each tracker must be maintained at one revolution per year, yet the 2° and 2½° lead-lag angles must each be increased in proportion to the gear reduction ratio. Since mechanical means capable of performing this task become excessively complex, it appears to be more practical to drive each shaft by individual motors whose speed can be programmed. Thus, two independent motors would be used, one to rotate the yokes' shafts, 12, and a second to rotate the declination-cranks' shafts, 30. The rotational rate of the yokes' motor can now be programmed to include all the corrections for the equation-of-time anomaly, while the rotational rate of the declination-cranks' motor can be made uniform and equal to one revolution per siderial day times the gear reduction ratio. The differential rotational velocity of the two shafts when geared down to each tracker must again equal one revolution per year.

The declination-cranks' motor must rotate at a constant speed as expressed in the following equation:

$$\omega_A = 2\pi N \left(1 + \frac{1}{365.242}\right) \qquad \text{V}$$

radians per day, wherein:

N = the total reduction (or amplification) ratio of the interspersed gear boxes.
$\pi = 3.14159$ The yokes' motor must rotate at a variable rate as expressed in the following equation:

$$\omega_B = 2\pi N + \frac{2\pi N}{365.242}\left[1 - \frac{(1-\epsilon^2)^{-3/2}(1+\epsilon \cos\theta)^2 \cos\Delta}{\cos^2(\theta - \theta_o)\sin^2\Delta + \cos^2\Delta}\right] \quad \text{VI}$$

radians per day, wherein:

$$\theta = \cos^{-1}\frac{(\cos E) - \epsilon}{1 - \epsilon \cos E} \quad \text{VII}$$

$$\theta_o = \cos^{-1}\frac{(\cos E_o) - \epsilon}{1 - \epsilon \cos E_o} \quad \text{VIIa}$$

wherein:

$$E - \epsilon \sin E = \frac{2\pi}{365.242} t \quad \text{VIII}$$

$$E_o - \epsilon \sin E_o = \frac{2\pi}{365.242} t_o \quad \text{VIIIa}$$

wherein:
t = time (in days from perihelion)
$t_o$ = time interval between perihelion and the vernal equinox (in days).
$\epsilon$ = elliptical eccentricity of earth's orbit (0.01674).
$\Delta$ = obliquity of the ecliptic (23.4523°).

Equation VI expresses the hour-angle rotational rate of the sun as a function of time and contains all the corrections for the equation-of-time anomaly. An equatorially-mounted yoke rotated at the rate expressed by this equation will follow the sun's hour-angle motion with great precision. Also, by rotating the declination-crank shaft, 30, at the uniform rotational rate expressed by equation V, the gimbal or support means, 40, will track the sun's declination motion with equal precision.

Equation VI is easily solved by programming a small digital computer or programmable calculator to repetitively determine the instantaneous rotational velocity of the yoke, 14, at regular time intervals from perihelion. A source of time, such as a clock signal, would be the only necessary input into the computer. The computer program, which directs each step of the computer operation as it progressively solves the equation, is generally referred to as "software" and is generated by those versed in writing software routines based upon input and output conditions. The output of the computer can take various forms. However, for the purposes of this invention a particularly useful output would be an electrical voltage or frequency which varies in direct proportion to the computer's instantaneous solution of the rotational-velocity equation. This output signal can then be used to control the rotational velocity of a variable-speed motor in real time. Various types of variable speed motors or rotational power sources are available and it is apparent that each could have its speed controlled by the computer's variable output signal. As an example, a D.C. stepping motor responds with great accuracy to a variable frequency pulse train, which a digital computer can generate also with great accuracy in response to the equation.

It is apparent that any number of solar trackers can be driven by the two programmed motors, whether it be a single solar tracker or an array of $2^n$ trackers as previously described.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. An automatic solar tracking apparatus comprising:
   a first rotatable shaft means;
   mounting means mounting said first rotatable shaft means parallel to the axis of rotation of the earth;
   a yoke rigidly attached to said first shaft;
   first rotating means for providing open loop rotation to said first rotatable shaft means at a substantially uniform and continuous rate of one revolution per mean solar day;
   correcting means for correcting the rotational rate of said first rotatable shaft means an amount equal to the equation-of-time anomaly so as to accurately follow the hour-angle motion of the sun;
   support means mounted on said yoke rotatable about an axis perpendicular to the rotational axis of said first rotatable shaft means;
   a second rotatable shaft means;
   linking means linking said support means to said second rotatable shaft means;
   second rotating means adapted to provide open-loop rotation to said second rotatable shaft means at a substantially uniform and continuous rate of one revolution per siderial day so that differential rotational rates of said second shaft and said corrected first shaft cause said linking means to automatically oscillate said support means by an amount substantially equal to the yearly declination motion of the sun.

2. The solar tracking apparatus according to claim 1 wherein said first rotating means comprises:
   a constant-speed motor;
   first coupling means connecting said motor to said first shaft, said first coupling means being proportioned to provide one revolution per mean solar day of said first shaft.

3. The solar tracking apparatus according to claim 2 wherein said first coupling means comprises:
   a plurality of gears coupling said motor to said first shaft for simultaneous rotation therewith.

4. The solar tracking apparatus according to claim 2 wherein said second rotating means comprises:
   a second coupling means coupling said motor to said second shaft whereby said second shaft makes one complete revolution per year relative to said first shaft.

5. The solar tracking apparatus according to claim 2 wherein said second rotating means comprises:
   a second coupling means coupling said motor to said second shaft whereby said support means makes one complete oscillation per year relative to said yoke.

6. The solar tracking apparatus according to claim 5 wherein said second coupling means provides a rotational rate of said second shaft relative to said first shaft substantially equal to the ratio of siderial days per year to the solar days per year.

7. The solar tracking apparatus according to claim 6 wherein said second coupling means comprises:
a plurality of gears coupling said second shaft to said first shaft for simultaneous rotation therewith.

8. The solar tracking apparatus according to claim 1 wherein said linking means comprises a spherical four-bar linkage.

9. The solar tracking apparatus according to claim 8 wherein the spherical four-bar linkage comprises:
a first arm having one end rigidly secured to said second shaft;
a second arm rotatably secured to said first arm by means of a first pivot;
a second pivot whose axis is perpendicular to the axis of said first pivot rotatably securing said second arm to said support means;
all axes of rotation meeting at a common point.

10. The solar tracking apparatus according to claim 9 wherein said support means comprises a gimbal having its ends rotatably secured to said yoke.

11. The solar tracking apparatus according to claim 1 wherein said second shaft is concentric with said first shaft.

12. The solar tracking apparatus according to claim 11 wherein said correcting means comprises:
correcting means for correcting errors due to the earth's orbit around the sun;
said correcting means adapted to advance and retard the rotation of said yoke an amount equal to the eccentricity and obliquity error in the earth's motion around the sun.

13. The solar tracking apparatus according to claim 12 wherein said correcting means comprises:
a lower main shaft and an upper main shaft comprising said first rotatable shaft means;
said rotating means rotating said lower main shaft at one revolution per mean solar day;
connecting means connecting said upper main shaft to said lower main shaft; and
said connecting means adapted to rotate the upper main shaft relative to the lower main shaft in a leading or lagging relationship according to anomalies in the earth's orbit around the sun.

14. The solar tracking apparatus according to claim 13 wherein said correcting means includes:
a first arm secured to the lower main shaft;
a second arm secured to the upper main shaft;
a crank arm connecting said first and second arms whereby said upper main shaft rotates with said lower main shaft in a leading or lagging relationship.

15. The solar tracking apparatus according to claim 14 including:
a gear train connecting said crank arm to said second shaft whereby said crank arm is rotated by the differential action of said second shaft with respect to said lower main shaft.

16. The solar tracking apparatus according to claim 15 wherein said gear train ratio is selected to rotate said crank at the differential rate of said second shaft with respect to said lower main shaft.

17. The solar tracking apparatus according to claim 15 wherein said gear train is selected to rotate said crank at twice the differential rate of said second shaft with respect to said lower main shaft.

18. The solar tracking apparatus according to claim 13 including:
a first arm secured to the lower main shaft;
a second arm secured to the upper main shaft;
a third arm rotatably mounted between said first and second shaft;
a first crank arm connecting said third arm to said second arm; and
connecting means connecting said first and second crank arms whereby said upper main shaft is rotated in a leading or lagging relationship with respect to the lower main shaft whereby the sun tracker automatically compensates for anomalies due to the eccentricity of the earth's orbit around the sun and due to the obliquity of the ecliptic.

19. The solar tracking apparatus according to claim 18 wherein said connecting means comprises:
a first gear train connecting said first crank arm to said second shaft;
a second gear train connecting said second crank arm to said second shaft; and
whereby said first and second crank arms are rotated simultaneously with said differential rotation of said second shaft with respect to said lower main shaft.

20. The solar tracking apparatus according to claim 19 wherein:
said first gear train has a one-to-one ratio; and
said second gear train has a two-to-one ratio.

21. The solar tracking apparatus according to claim 1 wherein:
a said first rotating means comprises;
a variable-speed motor;
first coupling means coupling said variable-speed motor to said first shaft;
said correcting means comprising a programmable speed-controlling means for adjusting the rotational rate of said variable-speed motor so as to rotate said first rotatable shaft at a rate substantially equal to the hour-angle rotational rate of the sun.

22. The solar tracking apparatus according to claim 21 wherein said first coupling means comprises:
a plurality of gears coupling said motor to said first shaft for simultaneous rotation therewith.

23. The solar tracking apparatus according to claim 21 wherein said programmable speed-controlling means comprises:
a computer program for repetitively solving an equation defining the hour-angle rotational rate of the sun as a function of time;
a programmable clock-controlled computer means having a variable output which varies in proportion to said program;
power transfer means driving said variable-speed motor in proportional response to the variable output of said computer means whereby said variable-speed motor will rotate said first rotatable shaft means at a rate defined by said equation.

24. The solar tracking apparatus according to claim 23 wherein said computer program is adapted to repetitively solve the following equation defining the hour-angle rotational rate of the sun, $\omega$ with respect to the earth as a function of time:

$$\omega = 2\pi N + \frac{2\pi N}{365.242}\left[1 - \frac{(1 - \epsilon^2)^{-3/2}(1 + \epsilon \cos\theta)^2 \cos\Delta}{\cos^2(\theta - \theta_o)\sin^2\Delta + \cos^2\Delta}\right]$$

radians per day, wherein:

$$\theta = \cos^{-1} \frac{(\cos E) - \epsilon}{1 - \epsilon \cos E}$$

$$\theta_o = \cos^{-1} \frac{(\cos E_o) - \epsilon}{1 - \epsilon \cos E_o}$$

wherein:

$$E - \epsilon \sin E = \frac{2\pi}{365.242} t$$

$$E_o - \epsilon \sin E_o = \frac{2\pi}{365.242} t_o$$

wherein:
t = time (in days from perihelion)
$t_o$ = time interval between perihelion and the vernal equinox (in days).
$\epsilon$ = elliptical eccentricity of earth's orbit (0.01674).
$\Delta$ = obliquity of the ecliptic (23.4523°).
N = reduction ratio of said first coupling means.
$\pi$ = ratio of the circumference to the diameter of a circle (3.14159).

25. Solar tracking apparatus according to claim 1 wherein said second rotating means comprises:
a constant-speed motor;
a second coupling means coupling said constant-speed motor to said second shaft;
said coupling means proportioned to provide a fixed rotational rate of one revolution per siderial day to said second shaft;
said second coupling means orientated to provide the same directional rotational sense to said second shaft as said first shaft so as to yield a differential rotation substantially equal to one revolution per year between said first and second shafts.

26. The solar tracking apparatus according to claim 25 wherein said second coupling means comprises:
a plurality of gears coupling said constant-speed motor to said second shaft for simultaneous rotation therewith.

27. The solar tracking apparatus according to claim 1 including:
a pedestal mounting said solar tracking apparatus with the axis of said yoke parallel to the earth's rotational axis.

28. The solar tracking apparatus according to claim 27 including:
a plurality of pedestals each having a solar tracking apparatus mounted thereon; and
connecting means connecting said solar tracking systems to a central drive unit.

29. The solar tracking apparatus according to claim 28 wherein:
said connecting means consists of a plurality of rotating drive shafts;
said drive shafts extending outward from said central drive unit;
said drive shafts branching geometrically by means of right-angle gear boxes; and
said drive shafts terminating in $2^n$ trackers where n is the number of similar branches in the array.

* * * * *